(12) United States Patent
Ciarnella et al.

(10) Patent No.: US 12,420,506 B2
(45) Date of Patent: Sep. 23, 2025

(54) METHOD AND APPLICATION UNIT FOR APPLYING A SOUND-ABSORBING MATERIAL IN AN INNER CAVITY OF A PNEUMATIC TIRE

(71) Applicant: Bridgestone Europe NV/SA [BE/BE], Zaventem (BE)

(72) Inventors: Alessio Ciarnella, Rome (IT); Paolo Straffi, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 317 days.

(21) Appl. No.: 18/012,029

(22) PCT Filed: Jun. 25, 2021

(86) PCT No.: PCT/EP2021/067567
§ 371 (c)(1),
(2) Date: Dec. 21, 2022

(87) PCT Pub. No.: WO2022/002799
PCT Pub. Date: Jan. 6, 2022

(65) Prior Publication Data
US 2023/0271394 A1 Aug. 31, 2023

(30) Foreign Application Priority Data
Jun. 30, 2020 (IT) .................. 102020000015748

(51) Int. Cl.
*B29D 30/06* (2006.01)
(52) U.S. Cl.
CPC .................. *B29D 30/0681* (2013.01)
(58) Field of Classification Search
CPC ........ B29D 30/0016; B29D 2030/0038; B29D 2030/0686
See application file for complete search history.

(56) References Cited

U.S. PATENT DOCUMENTS

2023/0173775 A1* 6/2023 Pontone ............. B29D 30/0681

FOREIGN PATENT DOCUMENTS

| DE | 102017219828 A1 | 5/2019 |
| EP | 2862702 A1 | 4/2015 |

(Continued)

OTHER PUBLICATIONS

International Search Report: Internatiional Search report for corresponding International application No. PCT/EP2021/067567 dated Sep. 22, 2021.

*Primary Examiner* — John J DeRusso
*Assistant Examiner* — Alexander D Booth
(74) *Attorney, Agent, or Firm* — Patterson Intellectual Property Law, PC

(57) ABSTRACT

Method and application unit (3) for applying a sound-absorbing material (2) to an inner cavity of a pneumatic tyre (1) using a strip (4) of sound-absorbing material (2) provided on one side with an adhesive layer (6) covered with a protective lining (7). The following steps are provided: attaching an initial part of the protective lining (7) to a recovery drum (26); partially winding the strip of sound-absorbing material onto the applicator roller (24); pressing, by means of the applicator roller (24), the strip (4) of sound-absorbing material (2) against the inner cavity of the pneumatic tyre (1) whilst the pneumatic tyre (1) is caused to rotate; and rotating the recovery drum (26) synchronously with the pneumatic tyre (1), such as to wind the protective lining (7) around the recovery drum (26), step-by-step, as the protective lining (7) is separated from the strip (4) of sound-absorbing material (2).

7 Claims, 8 Drawing Sheets

(56) References Cited

FOREIGN PATENT DOCUMENTS

| | | | |
|---|---|---|---|
| IT | 202000009493 A1 | * | 4/2020 |
| JP | 2007168243 A | | 7/2007 |
| WO | 2018079247 A1 | | 5/2018 |

* cited by examiner

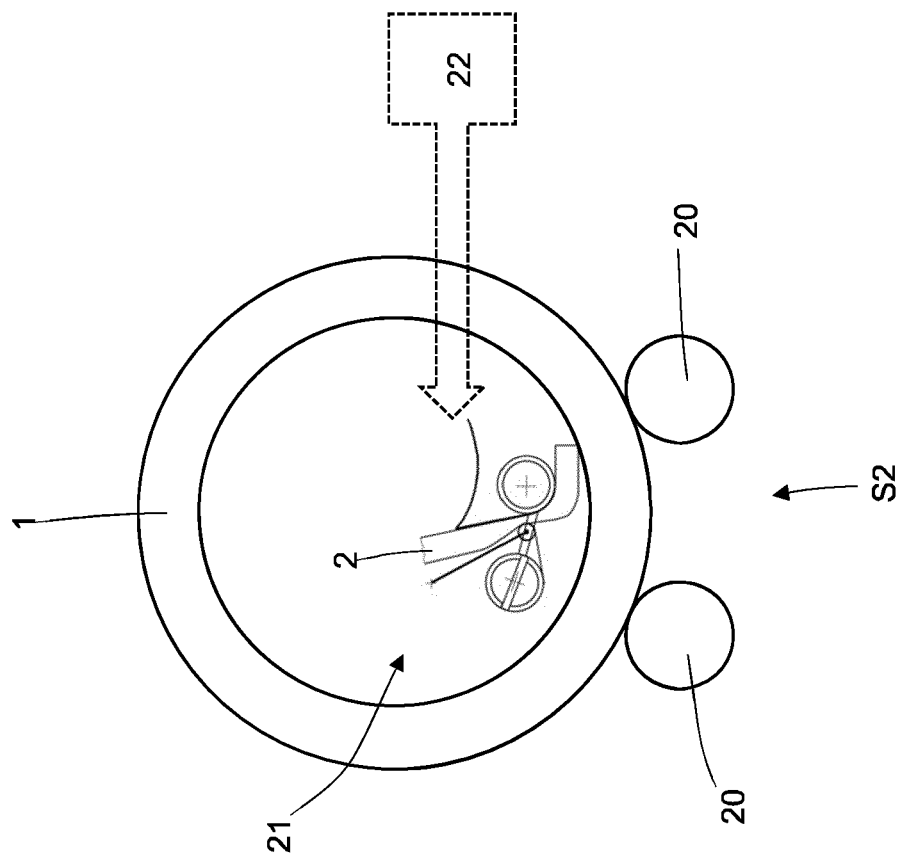
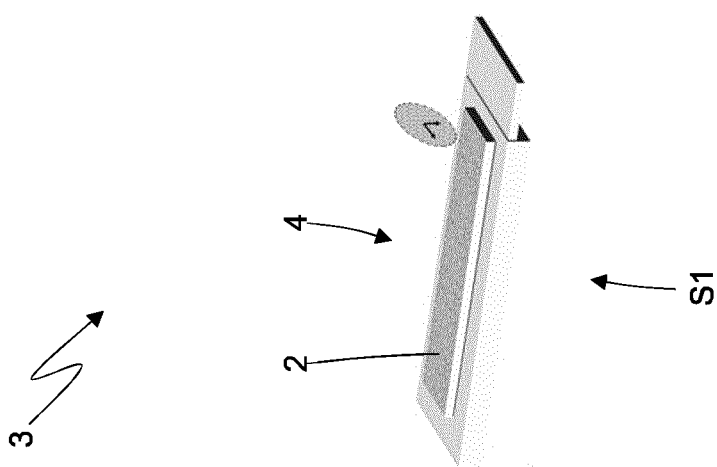
Fig. 2

METHOD AND APPLICATION UNIT FOR APPLYING A SOUND-ABSORBING MATERIAL IN AN INNER CAVITY OF A PNEUMATIC TIRE

TECHNICAL SECTOR

The present invention relates to a method and application unit for applying a sound-absorbing material in an inner cavity of a pneumatic tire.

PRIOR ART

As it is known, a pneumatic tire comprises a toroidal carcass, which has two annular beads and supports an annular tread. Between the carcass and the tread, a tread belt is interposed which is provided with a number of tread plies. Within the carcass ply, an innerliner is arranged which is airtight, constitutes an inner lining and has the function of retaining the air within the pneumatic tire in order to maintain the inflation pressure of the pneumatic tire itself over time.

In recent years the development of pneumatic tires has been directed towards pneumatic tires that are internally provided with a sound-absorbing material (generally a sponge) for reducing the noise generated by a pneumatic tire rolling on a road surface.

The sound-absorbing material is applied to a pneumatic tire that has already been vulcanized (inasmuch as the sound absorbing material would not be able to withstand, without being damaged, the combination of heat and pressure that is applied during the vulcanization process), and in particular it is glued to the inner surface of the pneumatic tire (comprising the innerliner) at the tread (i.e., corresponding to the area of the pneumatic tire that comes into contact with the asphalt) and possibly also at part of the side walls.

The sound-absorbing material is provided with an adhesive layer that is applied to the surface that is intended to contact with the inner cavity of the pneumatic tire and is initially covered (protected) with a removable protective lining ("liner") that serves the function of both protecting the adhesive layer, and the function of making it possible to wind the sound absorbing material into a coil without the sound-absorbing material sticking to itself.

Typically, the process for the application of the sound-absorbing material inside the inner cavity of a pneumatic tire provides for starting with a strip of sound-absorbing material (possibly wound into a coil) of a standard length that is more than required; it is then necessary, initially, to cut the strip of sound-absorbing material in order to eliminate the excess part and thereby confer to the strip of sound-absorbing material the length required depending upon the inner circumference of the pneumatic tire whereupon the strip of sound-absorbing material is to be glued; in other words, it is necessary, initially, to cut the strip of acoustic material to size. After being cut to size, the strip of sound-absorbing material is wound onto itself such as to form a coil.

In practice an operator loads the coil of the strip of sound-absorbing material that has been cut to size into an applicator device comprising an applicator roller that is configured in order to press, after the removal of the protective lining (which occurs a moment before pressing the sound-absorbing material against the inner surface), the sound-absorbing material against the inner surface of the pneumatic tyre; furthermore, the applicator device comprises a protective lining recovery drum whereupon the same protective lining is wound after being separated from the sound-absorbing material (i.e. after having completed its function). The applicator roller and the recovery drum are provided with actuating means that are suitable for bringing the same into rotation around the respective axis of rotation thereof, at appropriate and synchronous speeds, in such a way as to prevent the protective lining and/or the sound-absorbing material from tearing due to excessive tension or being too loose.

When the operator loads the strip of sound-absorbing material into the applicator device, the operator has to manually separate, from the sound-absorbing material, an initial part of the protective lining, which has to then be inserted (again manually) into a slot in the recovery drum. During the application of sound-absorbing material, it is preferable to separate the protective lining from the sound-absorbing material just before the application thereof in such a way as to leave the adhesive exposed to air for as short a period of time as possible, in order to prevent foreign objects (debris, dust, dirt, insects ... ) from accidentally adhering to the adhesive layer.

In the meantime, the previously vulcanized pneumatic tire is supported upon motorized rollers that cause it to rotate and that are provided with fixed side rails that prevent any lateral translation of the pneumatic tire itself. In response to an operator command, an applicator device is inserted into the pneumatic tire, carried by the motorized rollers, that presses a leading end of the strip of sound-absorbing material against the inner surface of the pneumatic tire; the pneumatic tire is then dragged into rotation by the motorized rollers in order to make it possible to apply the sound-absorbing material over the entire inner surface (i.e., making a full turn and thereby imparting an annular shape to the sound-absorbing material).

The method described above for the application of sound-absorbing material within a pneumatic tire inevitably requires the manual intervention of an operator in order to separate the initial part of the protective lining from the sound-absorbing material; moreover, this operation is particularly long and complicated, even for an experienced operator, and can result in damage to the adhesive layer.

Furthermore, it is important that, during the application within the cavity, the sound-absorbing material does not undergo elongations or compressions which, after a few thousand kilometers of use of the pneumatic tire, may lead to cracks within the sound-absorbing material itself.

DESCRIPTION OF THE INVENTION

The object of the present invention is to provide a method and an application unit for applying a sound-absorbing material within an inner cavity of a pneumatic tire, which method and application unit make it possible to render the entire application cycle more efficient (i.e. quicker and less expensive) and also more effective (i.e. capable of avoiding damage to the adhesive layer during the separation of the initial part of the protective lining from the sound-absorbing material).

According to the present invention a method and an application unit are provided for applying a sound-absorbing material inside an inner cavity of a pneumatic tire, according to that set forth in the attached claims.

The claims describe preferred embodiments of the present invention forming an integral part of the present description.

BRIEF DESCRIPTION OF THE DRAWINGS

The present invention will now be described with reference to the attached drawings, which show an exemplary, non-limiting embodiment, wherein:

FIG. 2 is a schematic view of an application unit for applying a sound-absorbing material within an inner cavity of a pneumatic tire;

PREFERRED EMBODIMENTS OF THE INVENTION

Figure 1:
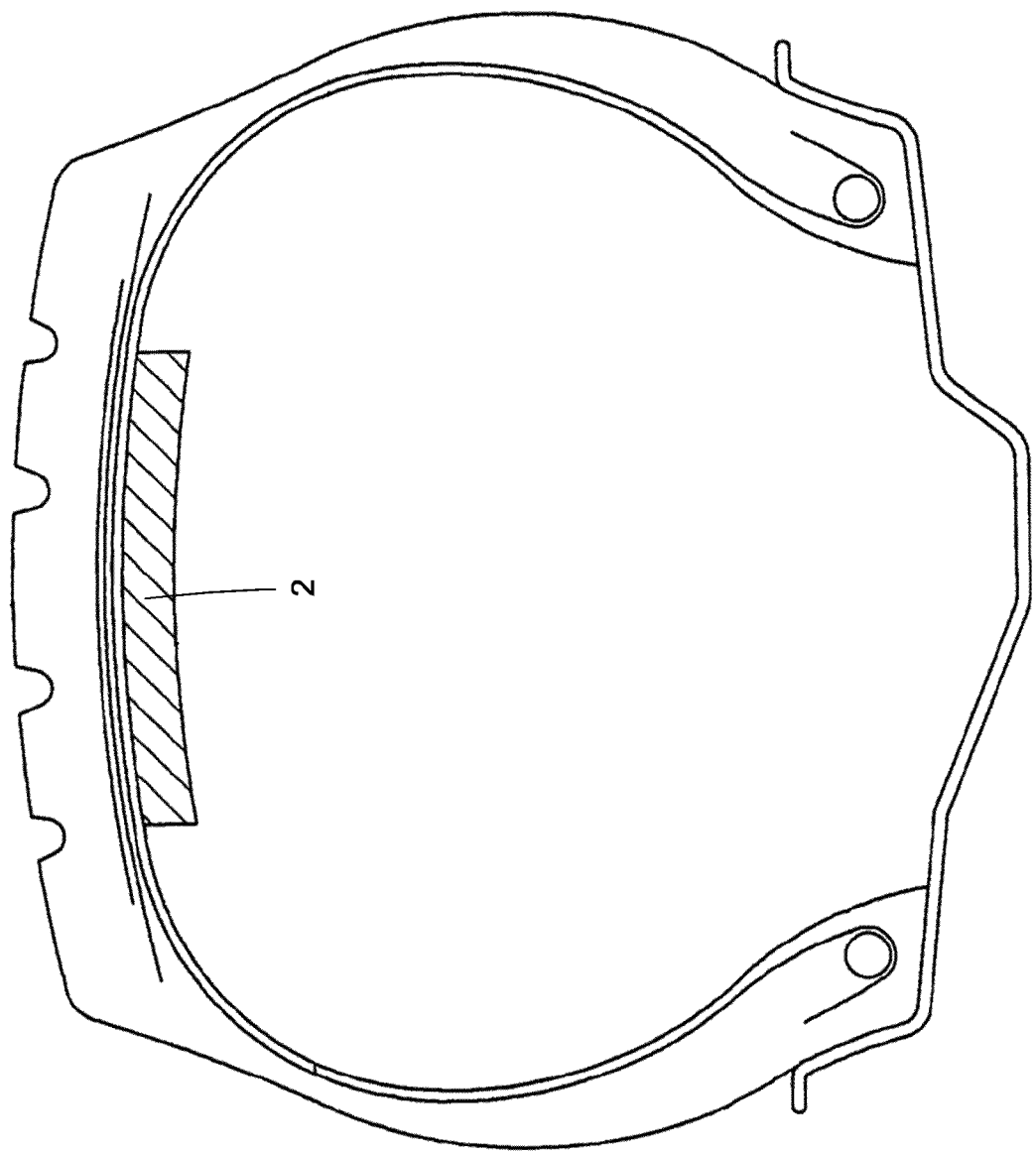
FIG. 1 is a schematic view of a pneumatic tire provided with sound-absorbing material arranged inside an inner cavity of a pneumatic tire.

In FIG. 1, the numeral 1 denotes, in the entirety thereof, a pneumatic tire that is mounted on a rim and that is provided with a toroidal carcass having two annular beads and that supports an annular tread. Between the carcass and the tread, a tread belt is interposed which comprises a number of tread plies. Inside the carcass ply, an innerliner is arranged which is airtight, constitutes an inner lining and has the function of retaining the air within the pneumatic tire in order to maintain the inflation pressure of the pneumatic tire itself over time. Within the inner cavity of the pneumatic tire1, i.e., in contact with the inner surface of the pneumatic tire 1 comprising the innerliner, a loop of sound absorbing material 2 is affixed (generally a sponge) to reduce the noise generated by the rolling of the pneumatic tire upon the road surface.

The sound-absorbing material 2 is applied to a pneumatic tire 1 that has already been vulcanized (inasmuch as the sound absorbing material 2 would not be able to withstand, without being damaged, the combination of heat and pressure that is applied during the vulcanization process), and in particular it is glued to the inner surface of the pneumatic tire 1 (comprising the innerliner) at the tread (i.e, corresponding to the area of the pneumatic tire that contacts with the asphalt) and possibly (but not necessarily) also at part of the side walls.

In FIG. 2, indicated in the entirety thereof with the number 3 is an application unit that is suitable for applying the sound-absorbing material 2, having an annular form, to the inner cavity of the pneumatic tire 1. The application unit 3 comprises a separation station S1, wherein an excess end 5 (illustrated in FIGS. 4 and 5) is separated from a strip 4 of sound-absorbing material 2 and a coupling station S2, wherein the strip 4 of sound-absorbing material 2 (deprived of the excess end 5) is applied to the inner cavity of the pneumatic tire 1.

In particular, the strip 4 of sound-absorbing material 2, initially, has a standard length that, depending upon the inner circumference of the inner cavity of the pneumatic tire 1, is greater than the required length, and therefore, initially, it is necessary to cut it to size, removing from the strip 4 of sound-absorbing material 2 the excess end 5 in such a way as to confer to the same strip 4 of sound-absorbing material 2 the required length (calculated as a function of the inner circumference of the pneumatic tire 1).

Figure 3:
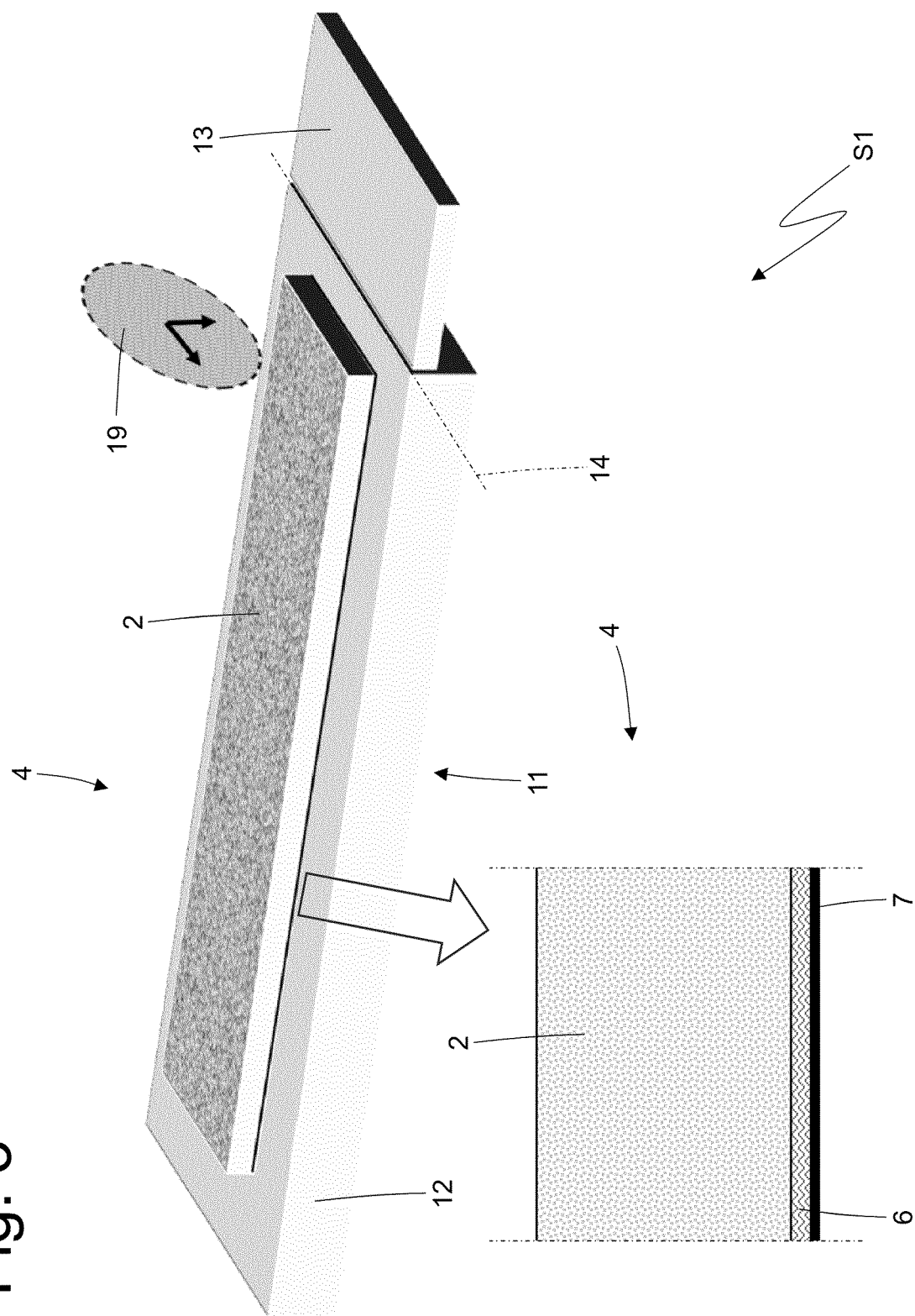
FIGS. 3, 4 and 5 are multiple views at different instants of operation of a separation station of the application unit of FIG. 2, wherein an excess end is separated from a strip of sound-absorbing material.
Figure 4:
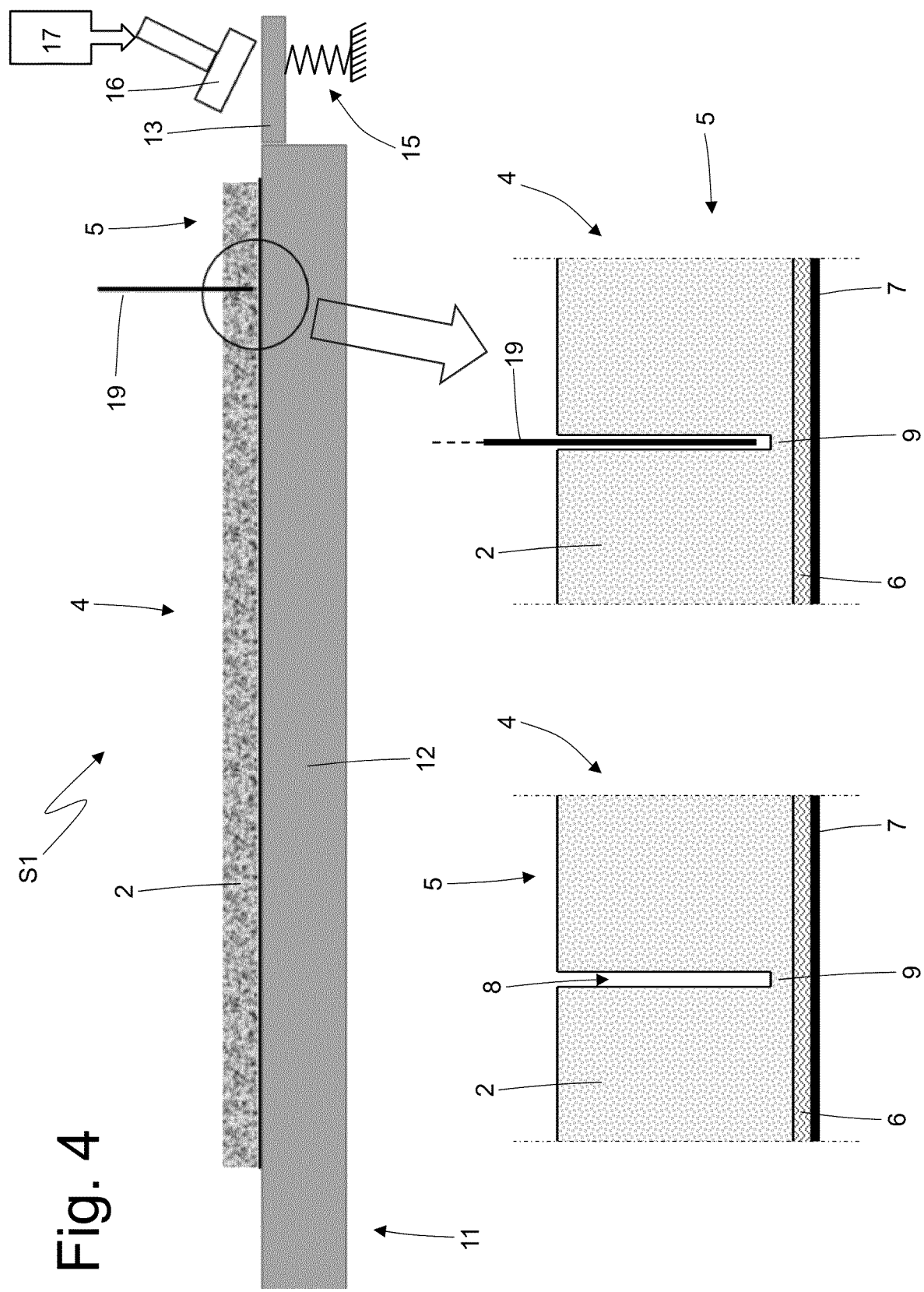
Figure 5:
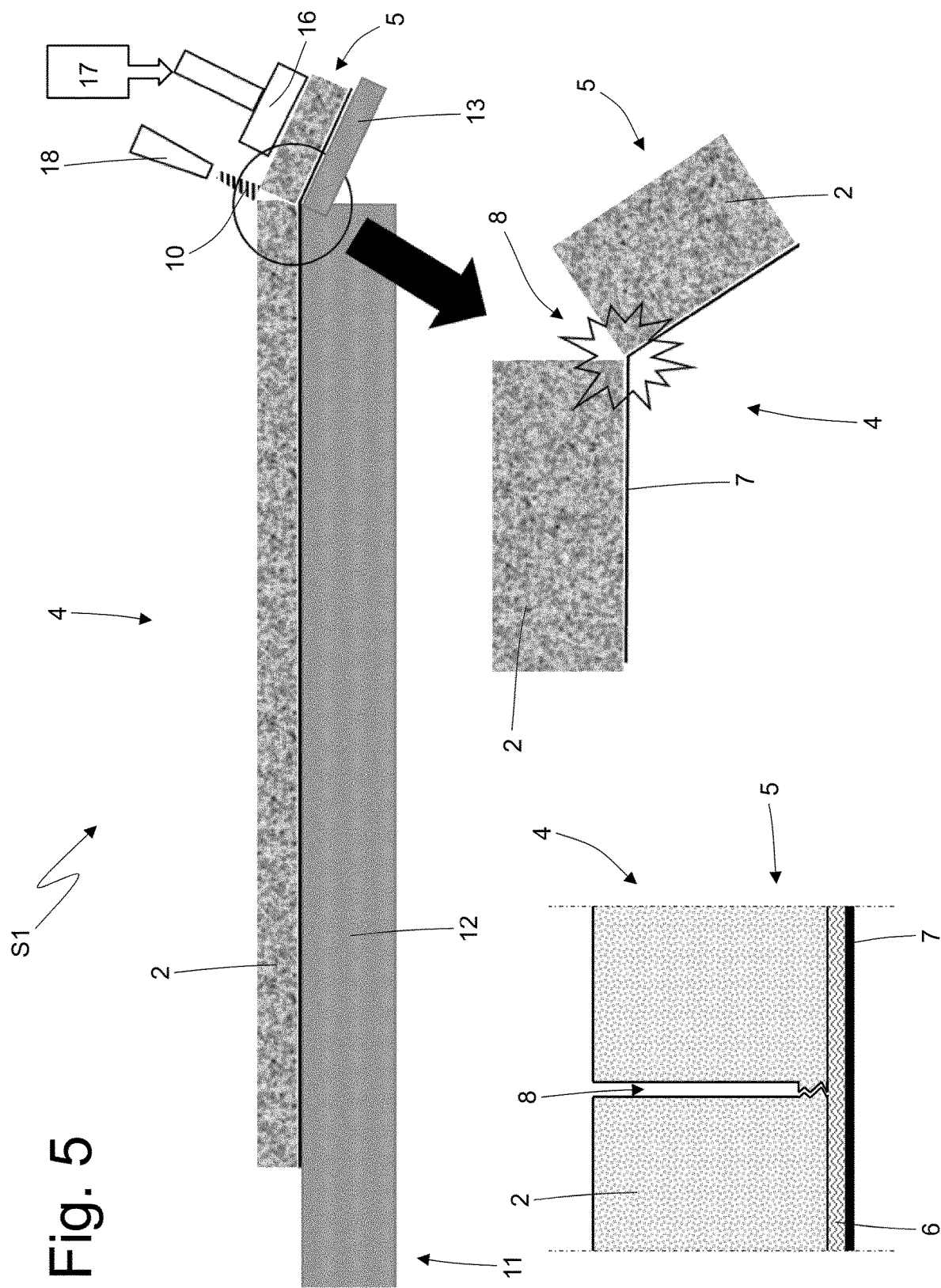
Figure 7:
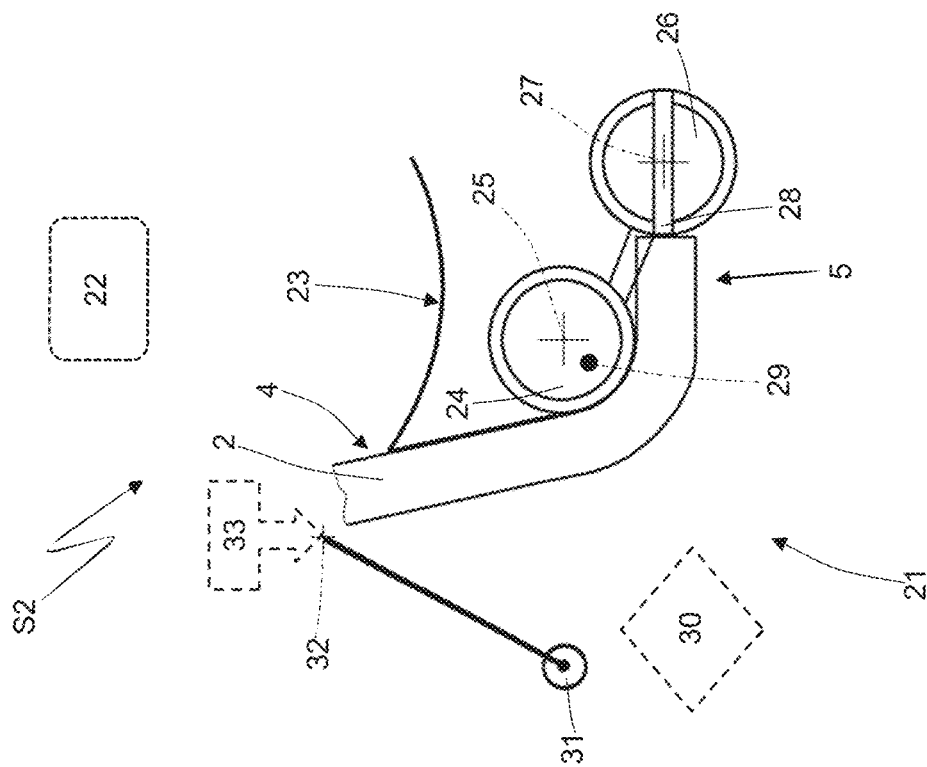
FIGS. 6-10 are multiple views at different instants of operation of a coupling station of the application unit of FIG. 2 wherein a strip of sound-absorbing material is applied to an inner cavity of a pneumatic tire.
Figure 6:
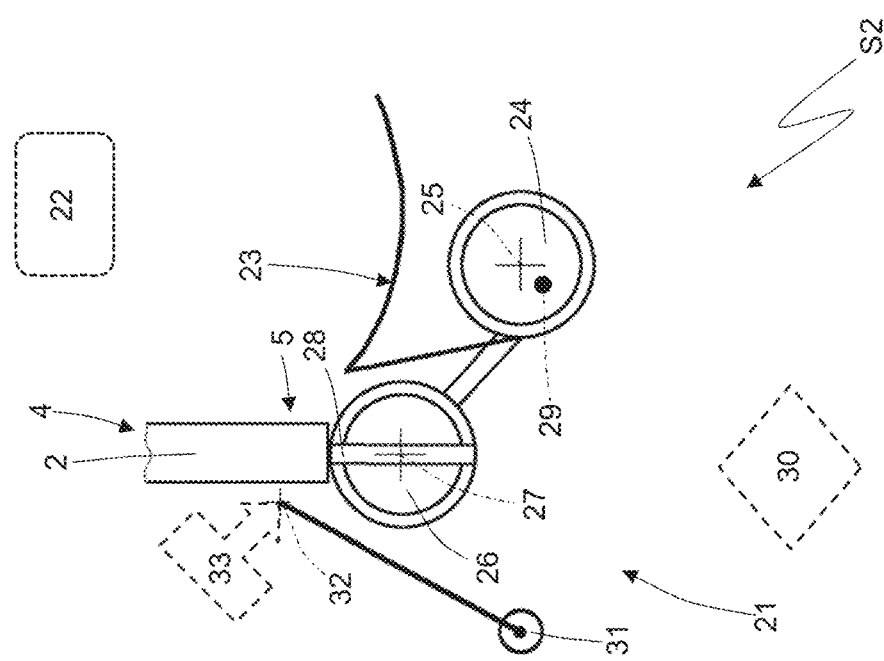

As illustrated in FIGS. 3, 4 and 5, the strip 4 of sound-absorbing material 2 is provided on one side with an adhesive layer 6 that is intended to connect the sound-absorbing material 2 to the inner surface of the pneumatic tire and that is covered by a protective lining 7 (i.e., with a ribbon of plastic material that adheres in a removable manner to the adhesive layer 6). That is to say that the adhesive layer 6 is applied to the surface of the sound-absorbing material 2 that is intended to come into contact with the inner cavity of the pneumatic tire 1 and that is initially covered (protected) with the removable protective lining 7 that serves both the function of protecting the adhesive layer 6 and the function of making it possible to wind the strip 4 of sound absorbing material 2 into a coil without the sound absorbing material 2 sticking to itself.

As previously stated, initially, in the separation station S1 the strip 4 of sound-absorbing material 2 is cut in such a way as to separate the excess end 5 and to thereby confer the required length (in order to implement, without overlapping, a loop of sound-absorbing material 2 within the pneumatic tire 1) to the strip 4 of sound-absorbing material 2; normally the strip 4 of sound-absorbing material 2 initially has a length that is only slightly longer than necessary, and therefore the cutting to size of the strip 4 of sound-absorbing material 2 involves the waste of only a small piece of sound-absorbing material 2 (i.e., the excess end 5 is small in size, generally ranging from a few centimeters to a few tens of centimeters).

As illustrated in FIG. 5, by means of the strip 4 of sound-absorbing material 2 a separation opening 8 is formed that starts from the opposite side of the protective lining 7, ends at the protective lining 7, which remains intact, and separates the excess end 5 from the remaining part of the strip 4 of 2 sound-absorbing material; in other words, the separation opening 8 involves the entire depth of the sound-absorbing material 2, separating the excess end 5 from the remaining part of the strip 4 of sound-absorbing material 2, and the separation opening 8 does not involve the protective lining 7 which remains intact, constituting a residual connection between the excess end 5 and the remaining part of the strip 4 of sound-absorbing material 2.

As illustrated in FIGS. 3, 4 and 5, the implementation of the separation opening 8 anticipates cutting, starting from an opposite side of the protective lining 7, the strip 4 of sound-absorbing material 2, leaving intact a residual portion 9 of the sound-absorbing material 2 (illustrated in FIG. 4) in the vicinity of the protective lining 7; the residual portion 9 of the sound-absorbing material 2 is then fractured by bending the excess end 5 in relation to the remaining part of the strip 4 of sound-absorbing material 2 in order to complete the separation opening 8 (as illustrated in FIG. 5).

According to a preferred embodiment, the residual portion 9 of the sound-absorbing material 2 is cooled such as to allow for clean fracturing of the residual portion 9 by means of bending. That is to say, in order be able to break the residual portion 9 of the sound-absorbing material 2 by bending it, it is necessary for the residual portion 9 to be sufficiently fragile, i.e., insufficiently elastic; in order to make the residual portion 9 sufficiently fragile, the same residual portion 9 is cooled to a (suitably) brittle state by cooling the sound-absorbing material 2 to close to the glass transition temperature (determined according to the ISO 11357-2 standard). Consequently, the residual portion 9 of the sound-absorbing material 2 is cooled to temperatures no higher than 10° C. in relation to the glass transition temperature (determined according to the ISO 11357-2 standard) of the sound absorbing material 2 and preferably cooled to temperatures that are 5° C. lower than the glass transition temperature (determined according to the ISO 11357-2 standard). The cooling of the sound-absorbing material 2 can be performed in blowing a low temperature cryogen gas 10 against the residual portion 9, dipping the sound-absorbing material 2 into a cryogenic liquid (bath), or placing (passing) the sound-absorbing material 2 within a cooling chamber that is partially open at both ends. The working temperature of the cooling system depends upon the glass transition temperature (determined according to the ISO 11357-2 standard) of the sound-absorbing material 2 and must be such as to confer to the sound-absorbing material 2, which constitutes the residual portion 9, sufficient brittleness for it to break when bent.

According to a different embodiment, not illustrated, the separation opening 8 is not implemented in part by means of mechanical cutting (i.e., using a sharp instrument) and in part by breaking it when bent, but is fully implemented by means of laser cutting; in fact, simple mechanical cutting (i.e., using a sharp instrument) may not provide sufficient accuracy in order to completely cut the sound-absorbing material 2 whilst leaving intact the protective lining 7, whilst laser cutting could ensure such sufficient accuracy (also because a laser might etch the sound-absorbing material 2 in a better way and the protective lining 7 in a worse way). As an alternative to laser cutting, water-cutting may be used (which might etch the sound-absorbing material 2 in a better way and the protective lining 7 in a worse way), or else ultrasonic cutting could be used (which might etch the sound-absorbing material 2 in a better way and the protective lining 7 in a worse way).

The separation station S1 comprises a support plane 11 having a portion 12 whereupon the strip 4 of sound-absorbing material 2 rests and a portion 13 whereupon the excess end 5 rests and which is hinged to the part 12 in order to rotate in relation to the part 12 around an axis of rotation 14 (illustrated in FIG. 3) arranged at the separation opening 8. According to a preferred embodiment, the part 13 of the support plane 11 is kept parallel to the part 12 of the support plane 11 by means of an elastic element 15 (for example, a helical spring, illustrated in FIG. 4); the separation station S1 comprises a pusher 16 (driven by an actuator device 17) that by pressing against the excess end 5 leads to the rotation of the part 13 of the support plane 11 in relation to the part 12 of the support plane 11 around the axis 14 of rotation in such a way as to bend the strip 4 of sound-absorbing material 2, and thereby determine the brittle fracturing of the residual portion 9.

At the axis 14 of rotation (i.e., at the boundary between the two parts 12 and 13 of the support plane 11 wherein the separation opening 8 is located), a nozzle 18 is arranged which is oriented towards the support plane 11, is connected to a reservoir containing the cryogen gas 10, and that is suitable for emitting a jet of cryogen gas 10 which (mainly) impacts the residual portion 9 such as to freeze the same residual portion 9, thereby rendering it fragile.

According to a preferred embodiment, the pusher 16 initially pushes against the excess end 5 in order to rotate the excess end 5, moving it away from the remaining part of the strip 4 of sound-absorbing material 2 in such a way as to widen the separation opening 8, thereby exposing the residual portion 9 to the nozzle 18; at this point, the pusher 16 temporarily stops, the nozzle 18 emits a jet of cryogen gas 10, which (mainly) impacts the residual portion 9 (by now well exposed to the nozzle 18), and only when the jet of cryogen gas 10 ends does the pusher 16 resume the movement thereof in order to further rotate the excess end 5, thereby determining at this point the brittle fracturing of the residual portion 9 that has been frozen. By way of example, the pusher 16 may initially rotate the excess end 5 by 20-40° in order to expose the residual portion 9 to the nozzle 18; subsequently, the pusher 16 may then rotate the excess end 5 until it reaches 60-90° in order to result in the brittle fracturing of the residual portion 9 that has been frozen.

In other words, initially, in the separation station S1, the excess end 5 is bent in relation to the remaining part of the strip 4 of sound-absorbing material 2 until it reaches a first bending angle (for example equal to 20-40°) such as to widen the separation opening 8, the low temperature cryogen gas 10 is blown against the residual portion 9, and finally the excess end 5 is bent further in relation to the remaining part of the strip 4 of sound-absorbing material 2 until it reaches a second bending angle (for example equal to 60-90°) greater than the first bending angle in order to break the residual portion 9.

As illustrated in FIGS. 3 and 4, the separation station S1 comprises a sharp instrument 19 (for example, a rotating circular blade) that is used to implement, by means of mechanical cutting, the initial part of the separation opening 8, or to cut the strip 4 of sound-absorbing material 2 until reaching the residual portion 9.

As illustrated in FIG. 2, once the strip 4 of sound-absorbing material 2 has completed the processing cycle thereof in the separation station S1 (i.e., when the separation opening 8 has been completed which separates the excess end 5 from the remaining part of the strip 4 of sound-absorbing material 2, leaving intact the protective lining 7), the strip 4 of sound-absorbing material 2 is wound on itself such as to form a coil (which terminates externally with the excess end 5) and is then transferred (in more or less an automated manner) to the coupling station S2.

The coupling station S2 comprises a support device that is suitable for supporting and bringing into rotation, around a central axis thereof, the pneumatic tire 1. In particular, the support device 20 comprises motorized rollers whereupon the pneumatic tire 1 itself rests and side rails (not illustrated) that contain the pneumatic tire 1, preventing the pneumatic tire 1 from performing any form of lateral translation during the rotational movement thereof.

The coupling station S2 comprises an applicator device 21 that is suitable for applying the strip 4 of sound-absorbing material 2 to the inner surface of the pneumatic tire 1, progressively removing the protective lining 7. That is to say, the applicator device 21 progressively separates the protective lining 7 from the strip 4 of sound-absorbing material 2 as the strip 4 of sound-absorbing material 2 is applied to the inner cavity of the pneumatic tire 1; in particular, the applicator device 21 initially pulls the excess end 5 in relation to the remaining part of the strip 4 of sound-absorbing material 2 such as to separate the protective lining 7 from the strip 4 of sound-absorbing material 2, i.e., the applicator device 21 uses the excess end 5 as a gripping point in order to begin to separate the protective lining 7 from the strip 4 of sound-absorbing material 2.

The coupling station S2 comprises a movement device 22 that supports the applicator device 21 and that is suitable for moving the applicator device 21 between a loading/unloading position wherein the applicator device 21 is separated from the pneumatic tire 1 (that is external to the pneumatic tire 1) and a work position (illustrated in FIG. 2) wherein the applicator device 21 is located within the pneumatic tire 1. In the loading/unloading position, a new strip 4 of sound-absorbing material 2, wound into a coil, is loaded into the applicator device 21 whilst only the previously applied protective lining 7 of a strip 4 of sound-absorbing material 2 is unloaded (removed) from the applicator device 21. Conversely, in the working position (illustrated in FIG. 2) a new strip 4 of sound-absorbing material 2, inserted into the applicator device 21, is applied to the inner cavity of the pneumatic tire 1.

According to that illustrated in FIGS. 6-10, the applicator device 21 comprises a housing 23 that is suitable for containing the strip 4 of sound-absorbing material 2 wound into a coil, an applicator roller 24 which, being mounted rotating around an axis of rotation 25, is suitable for pressing the strip 4 of sound-absorbing material 2 against the inner surface of the pneumatic tire 1 in order to adhere the strip 4 of sound-absorbing material 2 to the inner surface of the pneumatic tire 1, and a recovery drum 26 that is mounted rotating around an axis 27 of rotation parallel to the axis 25 of rotation, and that is suitable for winding the protective lining 7, step-by-step, such that the protective lining 7 is separated from the strip 4 of sound-absorbing material 2. In particular, the housing 23 is arranged above the applicator roller 24 and above the recovery drum 26. In other words, the applicator device 21 comprises an applicator roller 24 that is configured to press the sound-absorbing material 2 against the inner surface of the pneumatic tire 1, after the removal of the protective lining 7, which occurs a moment before pressing the sound-absorbing material 2 against the inner surface of the pneumatic tire 1; furthermore, the applicator device 21 comprises a protective lining recovery drum 26, whereupon the same protective lining 7 is wound after being separated from the sound-absorbing material 2, i.e., after having completed its function.

During the application of the sound-absorbing material 2, it is preferable to separate the protective lining 7 from the sound-absorbing material 2, just before the application thereof, in such a way as to leave the layer 6 of adhesive exposed to air for as short a period of time as possible, in order to prevent foreign objects (debris, dust, dirt, insects . . . ) from accidentally adhering to the adhesive layer.

The applicator roller 24 and the recovery drum 26 are provided with actuating means that are suitable for bringing them into rotation around the respective axis 25 and 27 of rotation at appropriate and synchronous speeds in such a way as to prevent the protective lining 7 and/or the sound-absorbing material 2 from tearing due to excessive tension or being too loose.

The recovery drum 26 is provided with a motorized grip member 28 (for example a gripper provided with two opposing jaws) that is suitable for grasping the excess end 5 of the strip 4 of sound-absorbing material 2 that is wound into a coil and located in the housing 23; i.e., the recovery drum 26 supports the motorized grip member 28 that is suitable for grasping the excess end 5 of the strip 4 of sound-absorbing material 2.

The recovery drum 26 is mounted movable in the applicator device 21 in order to move itself to different positions (illustrated in FIGS. 6-10) along a circular trajectory (i.e., along an arc of circumference); i.e., the recovery drum 26, other than being mounted rotating around the central axis 27 of rotation in order to rotate upon itself, it is pivotally mounted in order to rotate around a further axis 29 of rotation that is parallel and eccentric (i.e., non-coaxial) in relation to the axis and 27 of rotation (i.e., in relation to the applicator roller 24 and the recovery drum 26). In particular, an actuator device 30 is provided that moves, as will be explained below, the recovery drum 26, by rotating the recovery drum 26 about the axis 29 of rotation (i.e., causing the recovery drum 26 to complete a circular path).

The applicator device 21 comprises a presser roller 31 that is suitable for pressing the strip 4 of sound-absorbing material 2 against the applicator roller 24 and that is mounted idling at one end of an arm that is hinged such as to rotate around an axis 32 of rotation (parallel to the axis 25, 27 and 29 of rotation) under the control of an actuator device 33. In rotating around the axis 32 of rotation, the presser roller 31 is movable between a passive position (illustrated in FIGS. 6 and 7) wherein the presser roller 31 is at a distance from the applicator roller 24 and from the strip 4 of sound-absorbing material 2, and an active position (illustrated in FIGS. 8, 9 and 10) wherein the presser roller 31 presses the strip 4 of sound-absorbing material 2 against the applicator roller 24.

Whilst the applicator device 21 is located in the loading/unloading position (i.e., externally to the pneumatic tire 1), the strip 4 of sound-absorbing material 2 is inserted, coiled, into the housing 23 of the applicator device 21, arranging the excess end 5 outside the housing 23 and facing downwards. Subsequently, the motorized grip member 28 of the recovery drum 26 grasps the excess end 5, thereby rendering the excess end 5 integral to the same recovery drum 26; during this step, the recovery drum 26 is arranged at an initial position (illustrated in FIG. 6) wherein the recovery drum 26 is arranged to the left of the applicator roller 24 (i.e., from a first side of the applicator roller 24) and is facing an outlet of the housing 23.

Subsequently, the actuator device 30 moves the recovery drum 26, which is holding the excess end 5, from the initial position (illustrated in FIG. 6) to an intermediate position (illustrated in FIG. 7) wherein the recovery drum 26 is arranged to the right of the applicator drum 24 (i.e., from a second side of the applicator drum 24 opposite the first side) such as to partially wind the strip 4 of sound-absorbing material 2 around the applicator roller 24. In other words, the actuator device 30 moves the recovery drum 26, which is holding the excess end 5, from the first side of the applicator roller 24 to the second side of the applicator roller 24 opposite the first side, such as to partially wind the strip 4 of sound-absorbing material 2 around the applicator roller 24.

Figure 8:
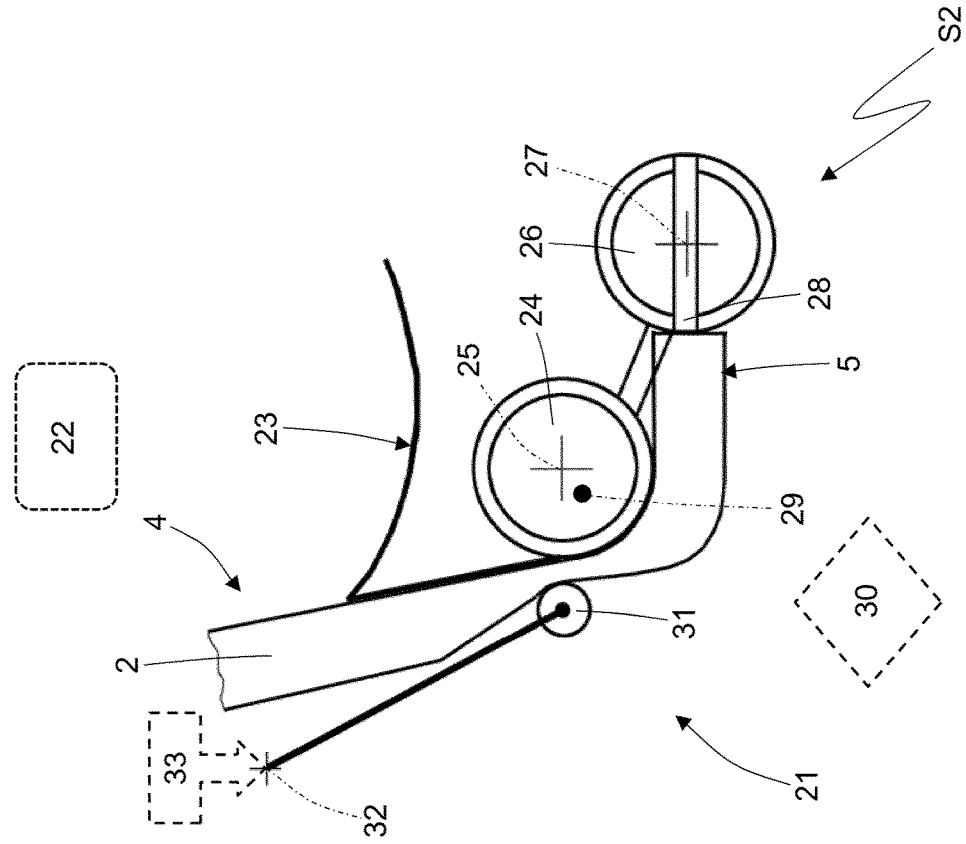

Subsequently and as illustrated in FIG. 8, the actuator device 33 moves the presser roller 31 from the passive position (illustrated in FIG. 7) to the active position (illustrated in FIG. 8) such as to press the strip 4 of sound-absorbing material 2 against the applicator roller 24.

Figure 9:
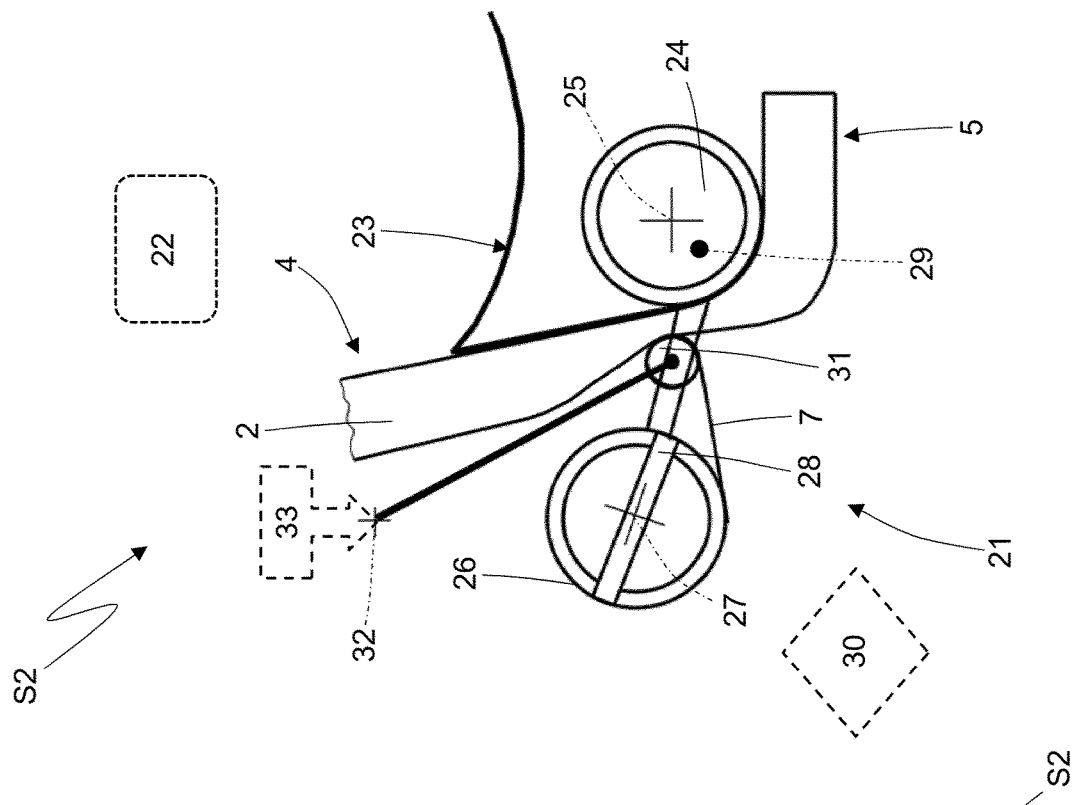

Subsequently and as illustrated in FIG. 9, the actuator device 30 moves the recovery drum 26, which is holding the excess end 5, from the intermediate position (illustrated in FIGS. 7 and 8) to a final position (illustrated in FIG. 9) wherein the recovery drum 26 is arranged to the left of the applicator drum 24 (i.e., from the first side of the applicator drum 24) such as to separate part of the protective lining 7 from the strip 4 of sound-absorbing material 2. In other words, the actuator device 30 moves the recovery drum 26, which is holding the excess end 5, from the second side of the applicator roller 24 to the first side of the applicator roller 24, such as to separate part of the protective lining 7 from the strip 4 of sound-absorbing material 2. When the recovery drum 26 is moved from the intermediate position (illustrated in FIGS. 7 and 8), which is located at the second side of the applicator roller 24, to the final position (illustrated in FIGS. 9 and 10), which is located at the first side of the applicator roller 24, the protective lining 7 is partially wound around the recovery drum 26.

Thus, the applicator device 21 is suitable for pulling the excess end 5 in relation to the remaining part of the strip 4 of sound-absorbing material 2 such as to separate the protective lining 7 from the strip 4 of sound-absorbing material 2.

In particular, the final position (illustrated in FIG. 9) of the recovery drum 26 is different than the initial position (illustrated in FIG. 7) of the recovery drum 26, i.e., when the recovery drum 26 is moved from the second side of the applicator roller 24 to the first side of the applicator roller 24, then it is arranged in the final position (illustrated in FIG. 9), which is different in relation to the initial position (illustrated in FIG. 6) that is assumed in order to grasp the excess end 5 (i.e. to grasp the initial part of the protective lining 7).

It should be noted that the recovery drum 26 is moved from the intermediate position (illustrated in FIGS. 7 and 8), which is located at the second side of the applicator roller 24, to the final position (illustrated in FIGS. 9 and 10), which is located at the first side of the applicator roller 24, before inserting the applicator device 21 (comprising the applicator roller 24 and the recovery drum 26) into the pneumatic tire 1.

Figure 10:
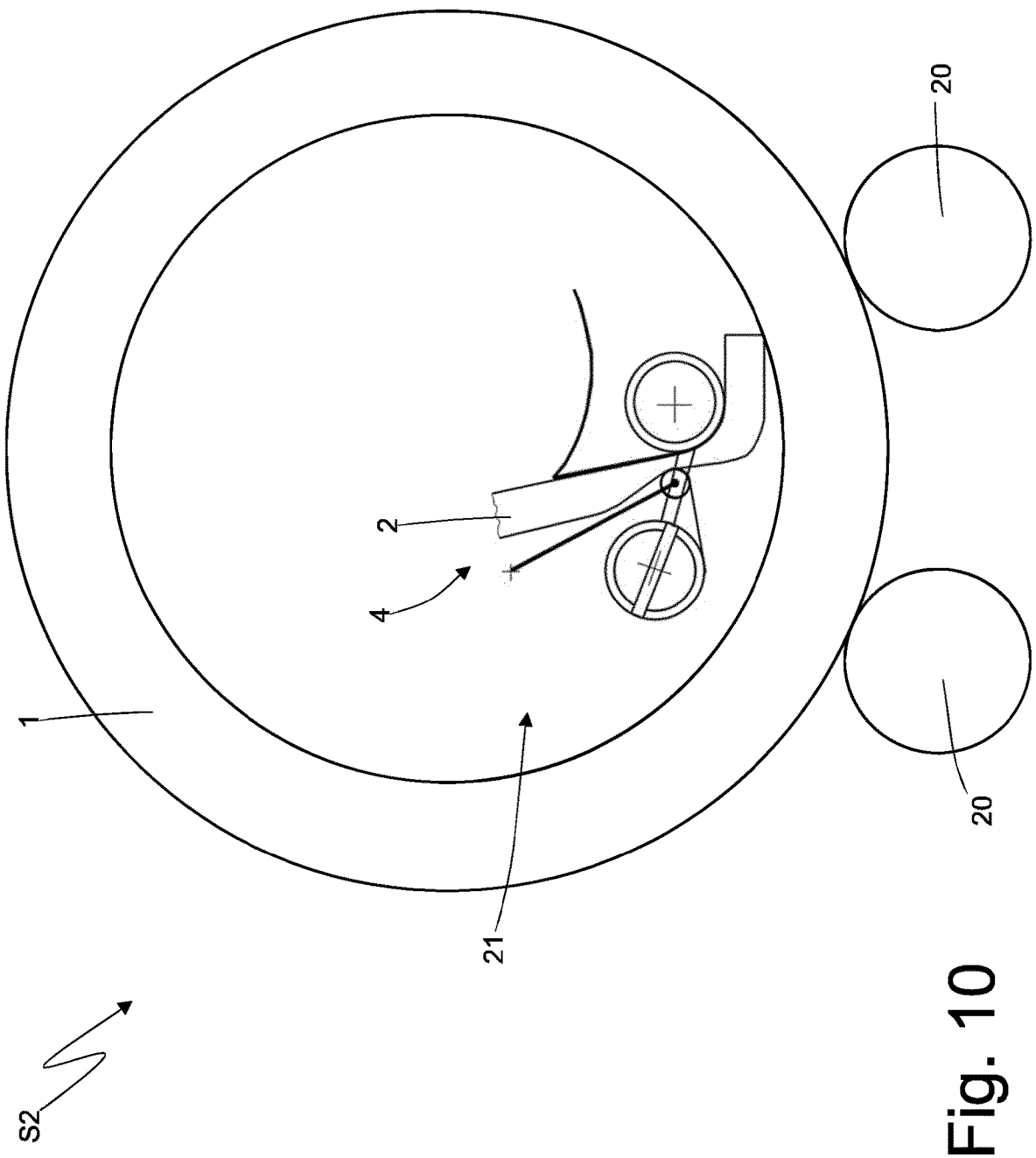

At this point and as illustrated in FIG. 10, the movement device 22 moves the applicator device 21 between the loading/unloading position (assumed in FIGS. 6-9), wherein the applicator device 21 is separated from, and external to, the pneumatic tire 1, and the working position (illustrated in FIGS. 2 and 10) wherein the applicator device 21 is located inside the pneumatic tire_1. In the work position (illustrated in FIGS. 2 and 10), the applicator roller 24 presses the strip 4 of sound-absorbing material 2 against the inner cavity of the pneumatic tire 1, whilst the pneumatic tire 1 is caused to rotate and, simultaneously, the recovery drum 26 is rotated synchronously with the pneumatic tyre 1, such as to wind the protective lining 7 around the recovery drum 26, step-by-step, as the protective lining 7 is separated from the strip 4 of sound-absorbing material 2.

In other words, the applicator device 21, when it is in the working position within the pneumatic tire 4, is configured to progressively separate the protective lining 7 from the strip 4 of sound-absorbing material 2, step-by-step, as the strip 4 of sound-absorbing material 2 is applied to the inner cavity of the pneumatic tire 1.

According to a preferred embodiment, the presser roller 31 moves away from the strip 4 of sound-absorbing material 2 before commencing with the rotation of the pneumatic tire 1; i.e., the actuator device 33 moves the presser roller 31 from the active position (illustrated in FIGS. 8, 9 and 10) to the passive position (illustrated in FIGS. 6 and 7) before commencing with the rotation of the pneumatic tire 1.

The embodiments described herein may be combined without departing from the scope of protection of the present invention.

The application unit 3 described above has many advantages.

In the first place, the application unit 3 described above makes it possible to fully automate the processing cycle, also as regards the separation of the initial part of the protective lining 7 from the sound-absorbing material 2; this result is obtained by virtue of the fact that the initial part of the protective lining 7 can be grasped in gripping the excess end 5 which can easily be grasped, also in an automated manner (being of considerable size and substantially disconnected from the remaining part of the strip 4 of sound-absorbing material 2).

Furthermore, the application unit 3 described above makes it possible to render the whole application cycle more efficient (i.e., quicker and less expensive, especially by virtue of the possibility of complete automation) and also more effective (i.e., capable of ensuring high quality of application such to avert any damage to the sound-absorbing material 2).

In particular, the application unit 3 described above ensures that, during the application within the inner cavity of the pneumatic tire 1, the sound-absorbing material 2 does not undergo elongations or compressions which, after a few thousand kilometers of use of the pneumatic tire 1, may lead to cracks within the same sound-absorbing material 2.

The invention claimed is:

1. An application unit for applying a sound-absorbing material in an inner cavity of a pneumatic tire using a strip of sound-absorbing material provided on one side with an adhesive layer covered with a protective lining, the application unit comprising:
   a recovery drum having a gripping member integral thereto and configured to grasp an initial part of the protective lining whilst the recovery drum is located at a first side of an applicator roller;
   the applicator roller, around which the strip of sound-absorbing material is partially wound;
   a first actuator device that is configured to press, using the applicator roller, the strip of sound-absorbing material against the inner cavity of the pneumatic tire whilst the pneumatic tire is caused to rotate;
   a second actuator device that is configured to rotate the recovery drum synchronously with the pneumatic tire to wind the protective lining around the recovery drum, step-by-step, as the protective lining is separated from the strip of sound-absorbing material; and
   a third actuator device configured to move the recovery drum, which is holding the initial part, from the first side of the applicator roller to a second side of the applicator roller, opposite the first side, to partially wind the strip of sound-absorbing material around the applicator roller.

2. The application unit of claim 1, wherein the third actuator device is configured to move the recovery drum from the second side of the applicator roller to the first side of the applicator roller before the applicator device and the recovery drum are inserted into the pneumatic tire.

3. The application unit of claim 2, wherein, when the recovery drum is moved from the second side of the applicator roller to the first side of the applicator roller, the protective lining is partially wound onto the recovery drum.

4. The application unit of claim 2, wherein, when the recovery drum is moved from the second side of the applicator roller to the first side of the applicator roller, it is arranged in a position that is different in relation to an initial position that was assumed to grasp the initial part of the protective lining.

5. The application unit of claim 2, wherein the applicator roller is moved away from the strip of sound-absorbing material before commencing with the rotation of the same pneumatic tire.

6. The application unit of claim 1, wherein the recovery drum is mounted rotating around a second axis of rotation that is parallel and eccentric to the applicator roller.

7. The application unit of claim 1, wherein the strip of sound-absorbing material is wound such as to form a coil and is located within a housing arranged above the applicator roller and above the recovery drum.

* * * * *